United States Patent
Hallivuori et al.

(10) Patent No.: US 10,498,027 B2
(45) Date of Patent: Dec. 3, 2019

(54) METHOD, SYSTEM AND DEVICES FOR FORMING A RADIO LINK

(71) Applicant: Provenance Asset Group LLC, Essex, CT (US)

(72) Inventors: Juha Hallivuori, Tampere (FI); Hannu Pirila, Littoinen (FI)

(73) Assignee: Provenance Asset Group LLC, Pittsford, NY (US)

( * ) Notice: Subject to any disclaimer, the term of this patent is extended or adjusted under 35 U.S.C. 154(b) by 337 days.

(21) Appl. No.: 15/538,786

(22) PCT Filed: Dec. 22, 2014

(86) PCT No.: PCT/FI2014/051039
§ 371 (c)(1),
(2) Date: Jun. 22, 2017

(87) PCT Pub. No.: WO2016/102740
PCT Pub. Date: Jun. 30, 2016

(65) Prior Publication Data
US 2017/0358859 A1   Dec. 14, 2017

(51) Int. Cl.
*H01Q 3/26* (2006.01)
*H04W 16/28* (2009.01)
(Continued)

(52) U.S. Cl.
CPC .......... *H01Q 3/2605* (2013.01); *H04W 16/28* (2013.01); *H04W 24/02* (2013.01);
(Continued)

(58) Field of Classification Search
CPC ... H01Q 3/2605; H01Q 3/2611; H04W 24/02; H04W 64/003; H04W 64/006; H04B 7/086; H04B 7/0854; H04B 7/08
(Continued)

(56) References Cited

U.S. PATENT DOCUMENTS

| 6,584,082 B1 * | 6/2003 | Willis ............... H04B 7/18584 370/316 |
| 2011/0205969 A1 | 8/2011 | Ahmad et al. |

(Continued)

FOREIGN PATENT DOCUMENTS

WO   WO2012/152306   11/2012

OTHER PUBLICATIONS

International Search Report dated Sep. 16, 2015 for Int'l Patent Application No. PCT/FI2014/051039, 3 pages.
(Continued)

*Primary Examiner* — Harry K Liu
(74) *Attorney, Agent, or Firm* — Dinsmore & Shohl LLP

(57) ABSTRACT

The invention relates to a method, devices and systems, where a first radio connection is formed from a user device to a communication network, and information of a location of the user device is provided to a server system connected to the communication network over the first radio connection. Then, link setup information is formed at the server system and provided from said server system over the first radio connection. The link setup information comprises data for forming a second radio connection from the location of the first user device to a communication network using a beam forming antenna. Utilizing this link setup information, a second radio connection is formed from the first user device to a communication network, and a beam forming antenna operating in a beam forming mode is used in the forming of the radio connection. The second radio link may be a link between the user device mounted in a fixed location, e.g. a wall of a building and a network radio node. The user device may be e.g. a LTE-to-the-home (LTTH) router that provides internet connectivity locally.

18 Claims, 6 Drawing Sheets

(51) Int. Cl.
*H04W 64/00* (2009.01)
*H04W 24/02* (2009.01)
*G06F 16/00* (2019.01)

(52) U.S. Cl.
CPC ....... *H04W 64/003* (2013.01); *H04W 64/006* (2013.01); *G06F 16/00* (2019.01)

(58) Field of Classification Search
USPC ........................................................ 342/368
See application file for complete search history.

(56) References Cited

U.S. PATENT DOCUMENTS

| | | | | |
|---|---|---|---|---|
| 2013/0051382 | A1* | 2/2013 | Derham | H04W 72/085 370/345 |
| 2013/0095846 | A1 | 4/2013 | Brisebois et al. | |
| 2014/0185516 | A1* | 7/2014 | Rubin | H04W 16/26 370/315 |
| 2014/0206304 | A1* | 7/2014 | Zhang | H04B 7/0617 455/125 |
| 2016/0119043 | A1* | 4/2016 | Rajagopal | H04B 7/063 370/329 |
| 2016/0174206 | A1* | 6/2016 | Xia | H04B 7/0491 370/329 |

OTHER PUBLICATIONS

PCT Written Opinion of the International Searching Authority dated Sep. 16, 2015 for Int'l Patent Application No. PCT/FI2014/051039, 5 pages.
PCT Written Opinion of the International Searching Authority dated Nov. 16, 2016 for Int'l Patent Application No. PCT/FI2014/051039, 5 pages.
PCT Notification of Transmittal of the International Preliminary Report on Patentability dated Apr. 10, 2017 for Int'l Patent Application No. PCT/FI2014/051039, 6 pages.

* cited by examiner

Antenna Array illustration:

360deg beam steering

Radiation pattern for pre-selected directions

120deg beam steering

Radiation pattern for pre-selected directions

Omnidirectional

METHOD, SYSTEM AND DEVICES FOR FORMING A RADIO LINK

BACKGROUND

Internet access is currently available almost anywhere, and modern radio communication technology enables transmission speeds that match wired communication speeds or even surpass them. In many cases, wireline or optical communication connections to the internet may not be available or they are expensive to arrange. For that reason, in many cases it may be technically most feasible to use a radio network for accessing the internet or connecting to private networks. By a radio network it is meant here that a communication network comprises nodes that can establish a connection to a user device and thereby allow the user device to connect to the communication network wirelessly.

There is, therefore, a need for solution that provide reliable ways to connect to radio networks.

SUMMARY

Now there has been invented an improved method and technical equipment implementing the method, by which the above problems are alleviated. Various aspects of the invention include a method, a device, a server system and computer readable medium comprising a computer program stored therein, which are characterized by what is stated in the independent claims. Various embodiments of the invention are disclosed in the dependent claims.

The examples provided herein relate to a method, devices and systems, where a first radio connection is formed from a user device to a communication network, and information of a location of the user device is provided to a server system connected to the communication network over the first radio connection. Then, link setup information is formed at the server system and provided from said server system over the first radio connection. The link setup information comprises data for forming a second radio connection from the location of the first user device to a communication network using a beam forming antenna. Utilizing this link setup information, a second radio connection is formed from the first user device to a communication network, and a beam forming antenna operating in a beam forming mode is used in the forming of the radio connection. The second radio link may be a link between the user device mounted in a fixed location, e.g. a wall of a building and a network radio node. The user device may be e.g. a LTE-to-the-home (LTTH) router that provides internet connectivity locally.

For example, a user device may form a first radio connection from the user device to a communication network, provide information of a location of the first user device to a server system connected to the communication network over the first radio connection, receive link setup information from the server system over the first radio connection, the link setup information comprising data for forming a second radio connection from the location of the first user device to a communication network using a beam forming antenna, and form a second radio connection from the first user device to the communication network using a beam forming antenna operating in a beam forming mode by using the link setup information.

For example, a network server system may receive information of a location of a user device to a server system connected to a communication network, form link setup information in the server system, the link setup information comprising data for forming a radio connection from the location of the first user device to a communication network using a beam forming antenna, and send the link setup information from the server system to the user device.

DESCRIPTION OF THE DRAWINGS

In the following, various embodiments of the invention will be described in more detail with reference to the appended drawings, in which.

DESCRIPTION OF EXAMPLE EMBODIMENTS

In the following, several embodiments of the invention will be described in the context of cellular radio networks such as contemporary 4th generation mobile communication systems. It is to be noted, however, that the invention is not limited to such implementations. In fact, the different embodiments have applications in any environment where establishing a radio link connection is required.

Figure 1A:
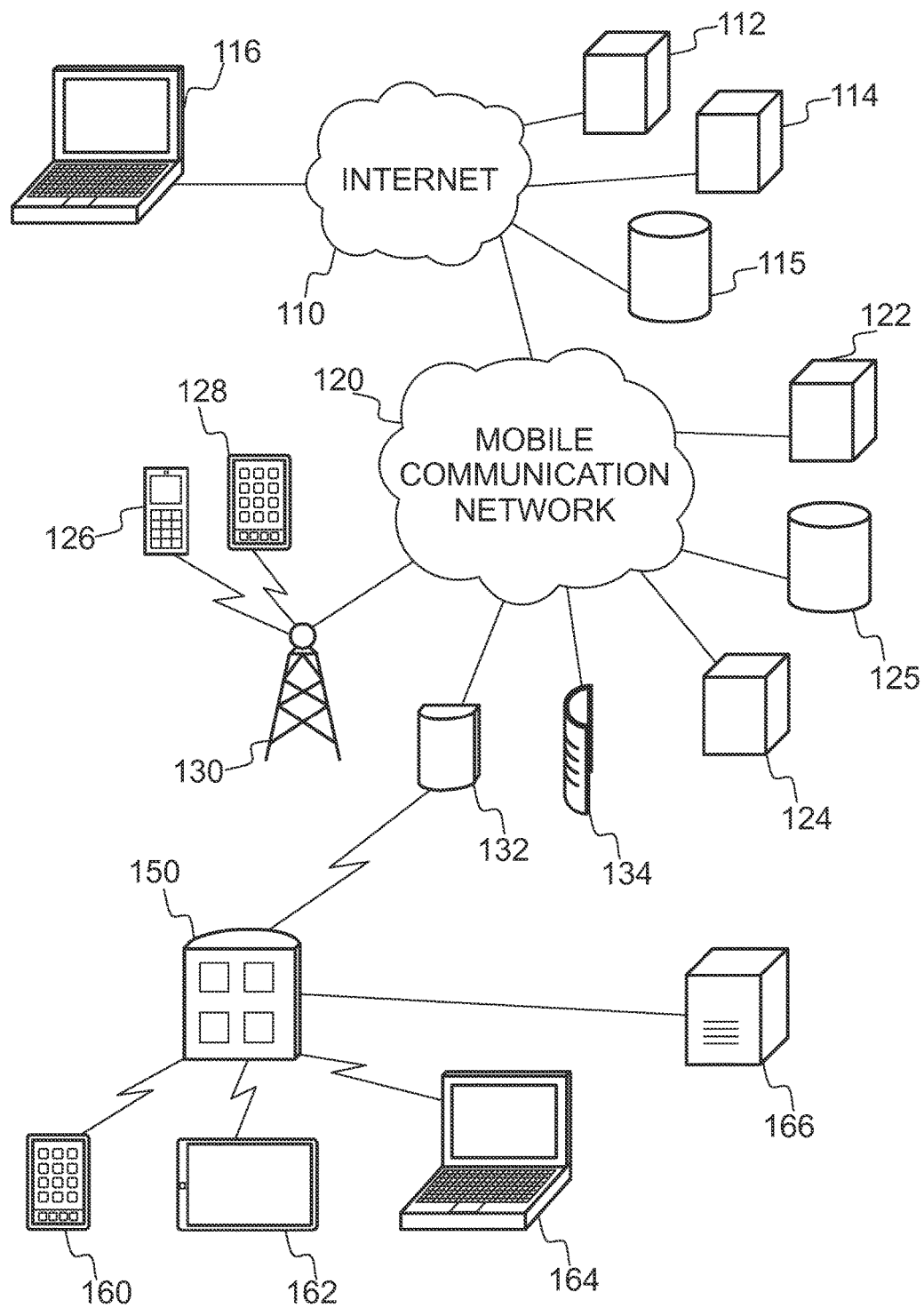
FIGS. 1a, 1b, 1c and 1d show examples of a communication arrangement with a server system, communication networks and user devices, and block diagrams for a server and user devices.

FIG. 1a shows a system and devices for forming a radio link connection to a network, e.g. a mobile communication network and/or the Internet. In FIG. 1a, the different devices may be connected via a fixed wide area network such as the Internet 110, a local radio network or a mobile communication network 120 such as the Global System for Mobile communications (GSM) network, 3rd Generation (3G) network, 3.5th Generation (3.5G) network, 4th Generation (4G) network, $5^{th}$ Generation network (5G), Wireless Local Area Network (WLAN), Bluetooth®, or other contemporary and future networks. Different networks are connected to each other by means of a communication interface, such as that between the mobile communication network and the Internet in FIG. 1a. The networks comprise network elements such as routers and switches to handle data (not shown), and radio communication nodes such as the base stations 130, 132 and 134 in order for providing access for the different devices to the network, and the base stations 130, 132, 134 are themselves connected to the mobile communication network 120 via a fixed connection or a wireless connection.

There may be a number of servers connected to the network, and in the example of FIG. 1a are shown servers 112, 114 for offering a network service for forming and providing link setup information for a user device, and a database 115 for storing link setup related information like radio connection coverage and quality information, and connected to the fixed network (Internet) 110. There are also shown a server 124 for offering a network service for forming and providing link setup information for a user device, and a database 125 for storing link setup related information like radio connection coverage and quality information, and connected to the mobile network 120. Some of the above devices, for example the computers 112, 114, 115 may be such that they make up the Internet with the communication elements residing in the fixed network 110.

There are also a number of user devices such as mobile phones 126 and smart phones 128, 160, Internet access devices (Internet tablets) 162, and personal computers 116, 164, 166 of various sizes and formats. These devices 116, 126, 128, 160, 164 and 166 can also be made of multiple parts. The various devices may be connected to the networks 110 and 120 via communication connections such as a fixed connection to the internet, a wireless connection to the internet, a fixed connection to the mobile network 120, and a wireless connection to the mobile network 120. The connections are implemented by means of communication interfaces at the respective ends of the communication connection.

There may also be a user device 150 for providing other user devices 160, 162, 164, 166 with access to a wide area network such as the internet or the mobile communication network. This user device 150 may be configured to form a connection to e.g. a mobile communication network such as the 4G or 5G network and route the communication data from the wide area network to a local area network. The user device 150 may be configured to create a local area network e.g. by operating as an access point for a WLAN network. Other user devices 160, 162, 164, 166 may use this local area network to gain access to the wide area network.

In this context, a user device may be understood to comprise functionality and to be accessible to a user such that the user can control its operation directly. For example, the user may be able to power the user device on and off. The user may also be able to move the device and/or mount the device e.g. to a wall. In other words, the user device may be understood to be locally controllable by a user (a person other than an operator of a network), either directly by pushing buttons or otherwise physically touching the device, or by controlling the device over a local communication connection such as Ethernet, Bluetooth or WLAN. The user may purchase the device from a computer store, and may thus own the device and be in a position to set access control (e.g. password) to limit access to the device. Alternatively, a service provider may provide such a device as part of the service agreement, and may thus control the device, e.g. over a communication connection. Nevertheless, the user may be able to power the device on and off, move the device, fix the device physically in place, and connect cables or optic fibers to the device for communication purposes.

Figure 1B:
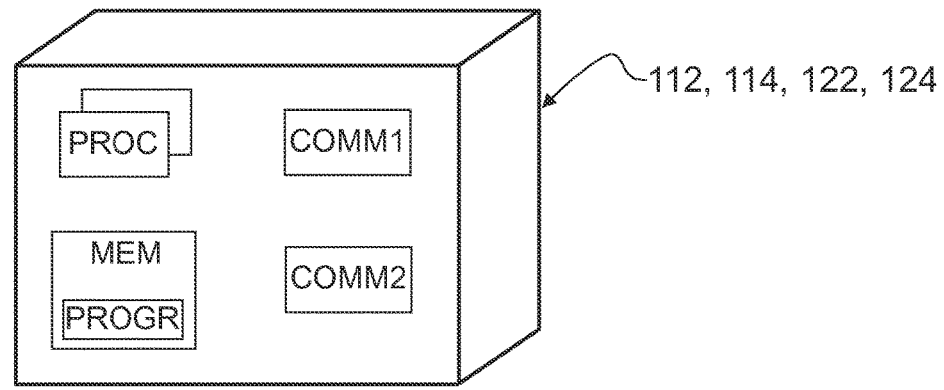

FIG. 1*b* shows a server device for providing link setup information for a radio communication connection. As shown in FIG. 1*b*, the server 112, 114, 122, 124 contains memory MEM, one or more processors PROC, and computer program code PROGR residing in the memory MEM for implementing, for example, determining and providing link setup information. The server may also comprise communication modules COMM1, COMM2 or communication functionalities implemented in one module for communicating with other devices. The different servers 112, 114, 122, 124 may contain these elements, or fewer or more elements for employing functionality relevant to each server. The servers 115, 125 may comprise the same elements as mentioned, and a database residing in a memory of the server. Any or all of the servers 112, 114, 115, 122, 124, 125 may individually, in groups or all together form and provide link setup for forming a radio connection. The servers may form a server system, e.g. a cloud.

Figure 1C:
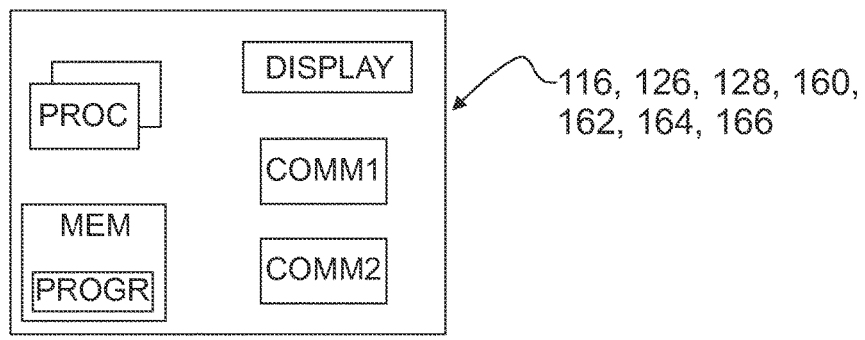

As shown in FIG. 1*c*, a user device 116, 126, 128, 160, 162, 164, 166 may contain memory MEM, at least one processor PROC, and computer program code PROGR residing in the memory MEM for implementing, for example, a radio link communication to a communication network. The user device may also have one or more cameras for capturing image data, for example video. The user device may also contain one, two or more microphones for capturing sound. The different user devices may contain the same, fewer or more elements for employing functionality relevant to each device. The user devices may also comprise a display DISPLAY for viewing a graphical user interface, and buttons, touch screen or other elements for receiving user input. The user device may also comprise communication modules COMM1, COMM2 or communication functionalities implemented in one module for communicating with other devices.

Figure 1D:
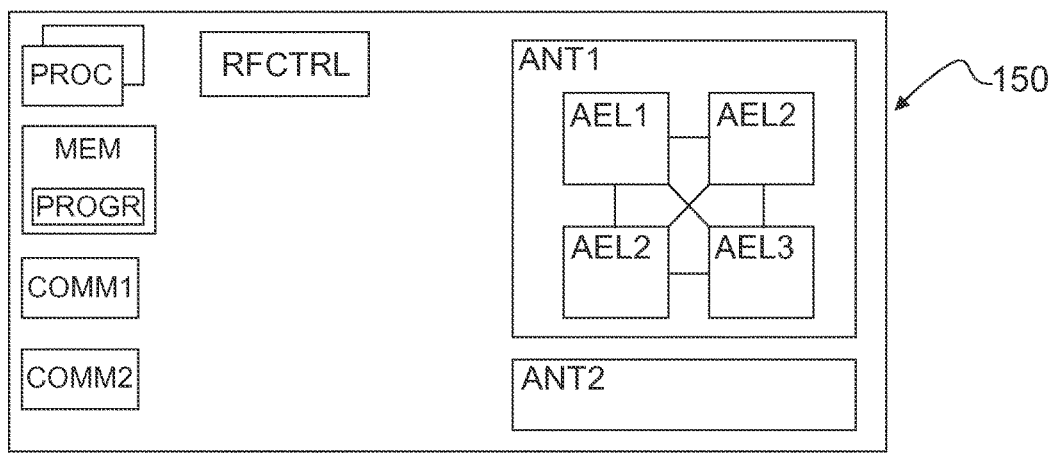

FIG. 1*d* shows a user device 150 for providing other user devices 160, 162, 164, 166 access to a wide area network such as the internet. The user device 150 may contain memory MEM, at least one processor PROC, and computer program code PROGR residing in the memory MEM for implementing, for example, a radio link communication to a communication network. The different user devices may contain the same, fewer or more elements for employing functionality relevant to each device. The user devices may also comprise a display DISPLAY for viewing a graphical user interface, and buttons, touch screen or other elements for receiving user input and controlling the user device 150, for example a power on/off button. The user device may also comprise communication modules COMM1, COMM2 or communication functionalities implemented in one module for communicating with other devices. For example, the user device may have a communication module COMM1 for providing a communication connection to a mobile communication network and a communication module COMM2 for providing a local area network to other user devices. The user device 150 may also have a module and/or functionality for determining location of the user device, e.g. by means of a global positioning system (GPS) positioning. An "apparatus" may be understood to be the same as a "device".

The user device 150 may also comprise one or more antenna modules ANT1, ANT2, or be operatively connected to one or more antenna modules. The user device may comprise radio-frequency control modules RFCTRL for controlling the antenna modules. For example, the user device may comprise one antenna module for connecting to a 4G communication network, and another antenna module for providing a WLAN network locally. The radio-frequency control module may control the operation of antennas, e.g. so that different antenna elements AEL1, AEL2, AEL3, AEL4 forming an antenna array have a phase difference and consequently, a directional radiation pattern or reception pattern is provided.

To determine the direction of radiation and direction of reception, direction of arrival (DOA) estimation methods may be used. Such methods may comprise an analog type method, where an antenna element array has certain pre-selected directions which are all tested for reception and the best one is selected. If proper signal strength is detected, the connection may be formed in one of these pre-selected directions. Alternatively, a base-band assisted DOA estimation may be carried out, where calculation methods are used to define correlations between different antenna-array-unit-receiver received- and estimated signals. The gained information is used to control the antenna array phases. Such digital DOA estimation is more expensive than the analog DOA because it requires special circuitry.

Different antenna elements AEL1, AEL2, AEL3, AEL4 may be used in different modes depending on the phasing and signal access. For example, if only one of the elements AEL1, AEL2, AEL3, AEL4 is used in communication, the form of the ANT1 radiation pattern is aerially more wide, e.g., wide beam or omnidirectional. This means that the communication connection may happen even if the base station is less optimally placed with respect to the planar antenna main direction. If Z (0°, 0°) is the main direction horizontally and vertically, the base station may be located at the direction of, for example Z (±60°, ±60°). The same "antenna mode" may be achieved if the signal to all the antenna elements AEL1, AEL2, AEL3, AEL4 are phased in such a way that the radiation patter of ANT1 appears as a wide beam. In another mode, the signal to the AEL1, AEL2, AEL3, AEL4 may be phased in such a way that the beam is concentrated on a particular direction. This in the previous mode example would mean that if the base station is at the direction of Z (0°, 0°), the connection, due to high antenna gain in the main direction and low gain in other directions, may provide optimum data speed for the system. However, if the base station is at some other direction Z (±60°, ±60°), a connection might not exist at all. To allow a good and fast connection in an arbitrary direction, information of the direction of the base station may be utilized. The direction may be known or calculated or found with trial and error. The antenna may be controllable so that the direction of the beam can be steered. As a principle, an omnidirectional radiation beam means that the power sent from the antenna is distributed evenly over the whole sphere around the antenna and a directional antenna pattern means that in some direction there is clearly less power radiated and some other direction has significantly more radiation power.

The various user devices and servers may take the form of communication devices, or other devices having communication capability. For example, the devices may be toys, home appliances like kitchen machines, entertainment devices (TV, music/media devices), or even parts of the building, clothes, vehicles, or any other devices that may communicate with each other.

It needs to be understood that different operations may be carried out in different elements or devices. For example, forming link setup information may be carried out entirely in one user device 150, or in one server device 112, 114, 122, 124 or across multiple user devices or across multiple server devices, or across both user devices and network devices. For example, the link setup information may be formed and stored in one device, and the forming of the radio communication may happen in another device. The relevant software for carrying out the functionality may reside on one device or distributed across several devices, as mentioned above, for example so that the devices form a so-called cloud.

The different embodiments may be implemented as software running on mobile devices and optionally on services provided by servers in a network. The mobile phones may be equipped at least with a memory, processor, display, keypad, motion detector hardware, and communication means such as 2G, 3G, WLAN, or other. The different devices may have hardware like a touch screen (single-touch or multi-touch) and means for positioning like network positioning or a global positioning system (GPS) module. There may be various applications on the devices such as a calendar application, a contacts application, a map application, a messaging application, a browser application, a gallery application, a video player application and various other applications for office and/or private use. The devices may have various communication modules for communicating with other devices.

Figure 2A:
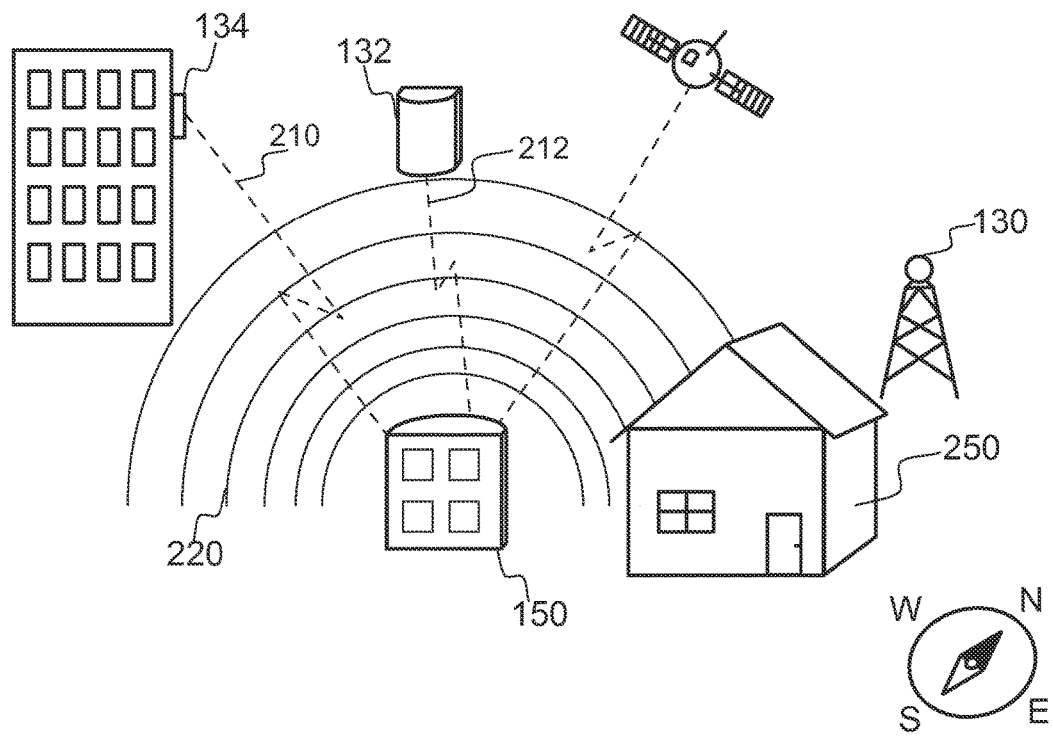
FIGS. 2a and 2b illustrate an arrangement for establishing a connection from a user device to a network using a radio link.

In FIG. 2a, the initial setup of a user device 150 for forming a radio link connection is shown. The user device may be a router device for connecting to mobile communication network such as the 3G or 4G network and for providing the network connection to other user devices over a local area network such as WLAN, as has been explained earlier. There may be a number of mobile communication network radio nodes 130, 132, 134 to which the user device may connect, e.g. so called Evolved Node B (eNB) of the 4th generation mobile communication (LTE, Long Term Evolution) network, base transceiver stations (BTS) of the GSM communication system, Node B:s of UMTS communication system, and so on. Some of these nodes (130) may not be able to provide a good signal e.g. inside a building 250, while others (132, 134) may be able to. Such differences may be due to different distance to the network radio node, due to walls and other obstacles, caused by reflections on the radio path etc. The locations of the network nodes may be known to an operator of the network, because they reside in fixed locations, but this information may not be accessible to users for various reasons. Also, the location of the building to which the user device 150 is planned to be installed may be known, e.g. as a street address and/or positioning coordinates. This location information may be used in forming link setup information for forming a radio link connection. Further, geographical directions (compass directions) around the user device may be known by means of an analog or digital compass, either in the user device 150 or in a smartphone or such.

The user device 150 may use a dual mode antenna for radio communication link setup. First, an omnidirectional or wide-pattern mode may be used, having a lower gain and consequently a lower transmission rate. Second, a beam forming antenna (a narrow-pattern mode) may be used. This narrow-pattern mode may employ e.g. pre-defined stages (directions), where the stages may be more selective (narrower) and thus have higher gain compared to the earlier described analog DOA estimation.

The initial wide-pattern stage 220 of the antenna may be used to establish at least a low bitrate radio connection 210, 212 to a radio node 134, 132. This connection may be used to obtain link setup information from the radio node, e.g. eNB, and/or the server system or cloud in the network via the radio node. The link setup information may be formed in the server system based on receiving data from the user device 150, e.g. information on radio node identifiers (cell IDs) that the user device receives, and/or position data of the user device 150. Alternatively or in addition, WLAN access point name(s) and/or street address received from the user may be provided from the user device to the server system.

A radio connection may be understood to be a communication connection formed using propagating radio-frequency electromagnetic waves, these radio-frequency waves having been transmitted from an antenna and received by another antenna such that information can be carried using the radio-frequency waves. A radio connection may be formed e.g. by a first antenna operating in a first mode such as omnidirectional mode to a network radio node. A second radio connection may be formed from the same first antenna, now operating in a different mode e.g. a directional mode, to the same or a different network radio node. In other words, a radio connection may be understood to be a connection where the user device antenna mode stays the same. Yet in other words, a radio connection may be understood to be different even though the connection takes place between the same user device and the same network radio node, if the user device antenna mode is changed. The user device antenna mode may be understood to be defined by the combination of uplink (user device to network radio node)

and downlink (network radio node to user device) modes. That is, the user device may initially operate e.g. in a broad or omnidirectional radiation pattern mode in uplink direction (transmission) and in a broad or omnidirectional receiving pattern mode in downlink direction (receiving) to form the first radio connection. Then, the user device may operate e.g. in a broad or omnidirectional radiation pattern mode in uplink direction (transmission) and in a narrow receiving pattern mode in downlink direction (receiving) to form the second radio connection. A radio connection of the user device may understood to have changed to another radio connection if the uplink radio mode has changed, the downlink radio mode has changed or both have changed.

Figure 2B:
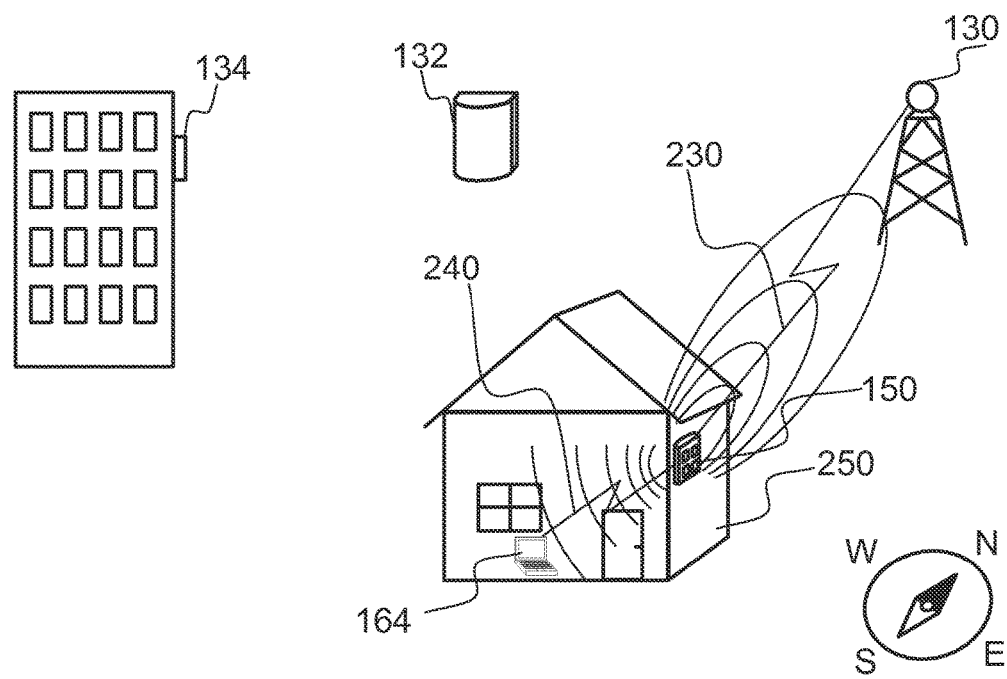

FIG. 2b illustrates the forming of a radio link connection. The user device has received data over the initial radio connection 210, 212. This data may be used to define the best radio node 130 (e.g. eNB) for a radio link connection for this receiver location. This radio node may be a different radio node 130 or the same radio node (132 or 134) as to which the initial radio connection with a wide-pattern antenna mode was formed. As described earlier, the location of the user device may be defined e.g. by GPS, or by receiving setup information from the user. The location data may be used to define on which side of the building 250 the best signal most likely is received and what would thus be the optimum placement for the user device 150, e.g. a LTE-to-the-home (LTTH) box. In FIG. 2b, this determination indicates that the user device 150, or at least a part of it containing the antennas, is to be placed on the east side of the building 150. Consequently, the user may, after having this direction information e.g. from the link setup information, fix the user device 150 to the wall of the building on the appropriate side (here, the east wall), thereby reducing the attenuation caused by the building when connecting to the radio node 130 from the user device 150.

Figure 3A:
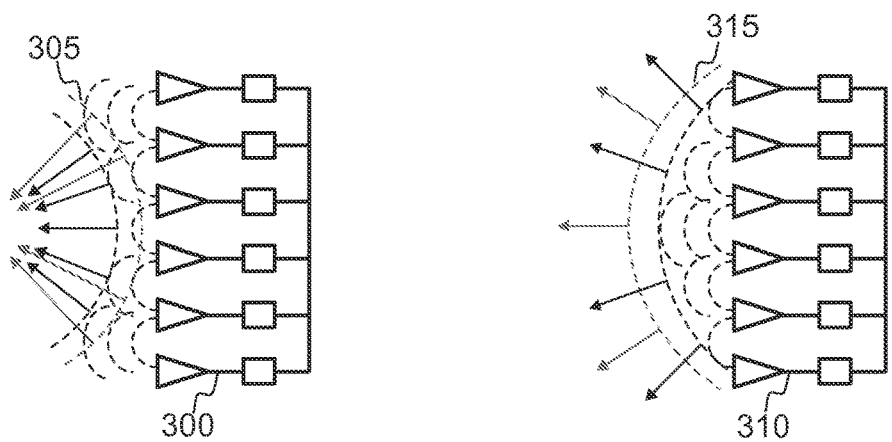
FIGS. 3a and 3b illustrate forming different antenna radiation patterns.

Once this type of pre-setup has been done a condensed analog DOA estimation can be carried out with narrow, high gain beams for connection 230 (see FIG. 3a illustration). The user device may receive link setup information from the server system. The link setup information may comprise radio node identification for connecting to the best radio node, link direction information for directing the antenna radiation pattern, mounting instructions for the user device etc. Once the appropriate direction has been found, a fast radio link connection 230 with a directional antenna radiation pattern may be formed, and information about this link may be stored into the memory of the user device for later use (e.g. if the device is powered off and on). This approach may improve the possibility of forming a good radio link, and/or may provide a faster link set-up time. At the same time minimum effort is required from the user, compared to the usual situation where the optimal location of the user device needs to be found by trial and error.

As described earlier, the user device 150 may form a local area network, e.g. by operating as a WLAN access point, and provide a connection 240 to the wide area network (e.g. internet) for another used device 164.

In the above, the network radio node (eNB) location and coverage mapping may be performed as a cloud service (by a server system) based on carrier data such as signal strength, transmission error and link connection reliability data, to define the best possible eNB to be used. For example, statistical data on connection speeds, error rate and link reliability may be collected and stored in the server system to be able to choose the optimal radio node for each user device location. User allocations to different radio nodes may also be utilized in the choice. Furthermore, map data, such as information on buildings, elevations and such may be used in determining the best signal path between the user device and the network radio node. The determination of the best radio node to use may also take place in a smartphone device or in the user device 150.

For the user device (LTE receiver/router) location may be defined with the help of a GPS receiver implemented in the user device (LTTH receiver/router). There may be an installation application (software) for a smartphone or a computer, or for the user device (router) that may give instructions to ensure that the user device is mounted to the right side of the building with correct initial beam direction. After the user has installed the box on the wall, the signal may be expected to arrive from the quadrant where the antenna beams are directed. The user device may perform a search of the radio node over an angle, for example 90 degrees or 120 degrees (see FIG. 3b). The installation software may also ask questions from the user to receive input for defining the location of the user device (e.g. a street address) if GPS is not implemented. Alternatively, another user device like a smart phone of the user may be utilized to define the location. For example, during the installation, the installation application may use location data from the phone.

The described method an devices may provide an improved radio link connection. Alternatively or in addition, the radio link connection setup may be made easier for the user compared to contemporary solutions.

FIG. 3a illustrates the principle of a directional antenna. The antenna has multiple antenna elements 300, 310, for example linear antenna elements or plane antenna elements, arranged to operate together. The radio frequency controller of the antenna causes the antenna elements to send radio waves with a set phase difference (delay) with respect to each other. In this manner, the characteristics and directional properties of the combined radio wave pattern may be controlled. For example, when an expanding (convex) radiation pattern 315 is desired, the antenna elements 310 on the edge may have a delay with respect to the central antennas. Such an expanding (convex) beam form may be used as the initial stage in forming the radio link connection. A focusing wave front 305 may be created by the antenna elements 300 in the center having a delay with respect to the antenna elements on the edge.

Figure 3B:
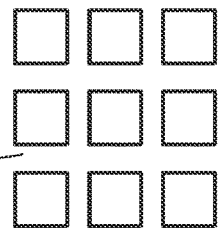
Figure 3B:
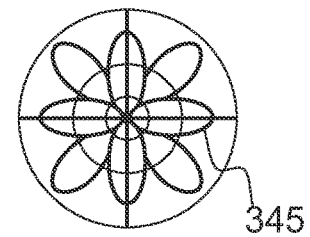
Figure 3B:
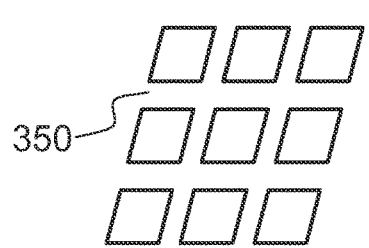
Figure 3B:
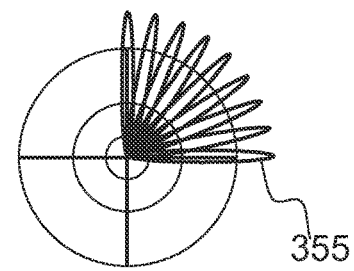
Figure 3B:
Figure 3B:
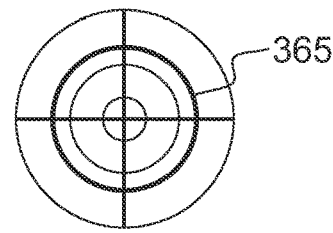

FIG. 3b illustrates different antenna radiation patterns for use in the forming of the radio link connection. A regular rectangular grid of planar antenna elements 340 may be used to create a directional radiation pattern by setting the inter-element phase difference appropriately. Different preset directions may be provided by the control unit of the antenna, resulting in a higher reception and transmission gain in one direction as shown by the radiation patterns 345 (the elliptic shapes illustrate alternative directions) around the whole 360 degree angle. By using different type of placements or different type of unit cells of antenna elements 350, for example a radiation beam steering in a 120 degree angle or 90 degree angle may be achieved. The resulting radiation and reception patterns 355 may have a higher gain, but respectively, a large portion of the whole 360 degree angle is not covered. On the other hand, the preset patterns may provide finer tuning, and this, together with the higher gain at wanted direction/less gain at unwanted directions, increases the quality of the link in the preset directions. If one of the array antenna elements 360 is used as a primary element and other elements are disconnected, the primary antenna element creates radiation pattern 365 equivalent of one single antenna (e.g. an omnidirectional pattern or a broad (wide-angle) pattern where the pattern covers e.g. at least 120 degrees of the whole 360 degree angle. A radiation pattern of approximately +/−45 degrees (angle of 90 degrees) or more may be considered to be a broad radiation pattern. A radiation pattern of approximately +/−15 degrees (angle of 30 degrees) or less may be considered to be a narrow radiation pattern. The terms "broad" and "narrow" may also be understood to be relative terms; where there are two radio connections to be compared, first radio connection may be considered to be broad and the second radio connection may be understood to be narrow if the radiation pattern of the second connection is narrower than the pattern of the first connection.

Figure 4A:
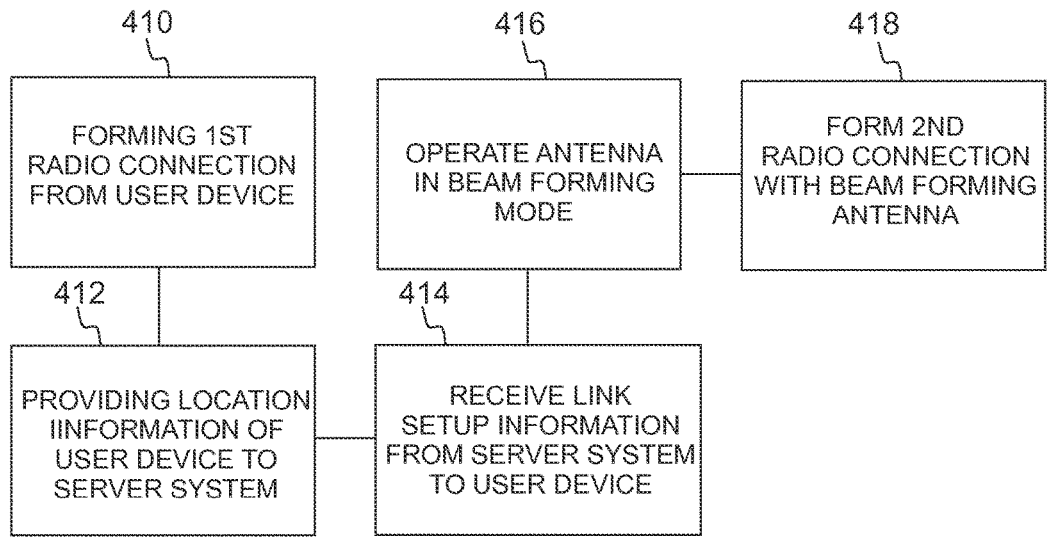
FIGS. 4a, 4b and 4c show flow diagrams of forming a radio connection from a user device to a network using a radio link.

FIG. 4a shows a flow chart for forming a radio link connection from a user device. In phase 410, a first radio connection from a first user device is formed to a communication network. As explained earlier, this first connection may be made with a wide-pattern antenna, e.g. an omnidirectional antenna such that the likelihood of being able to form the connection is high. The first radio connection may also be made with a directional antenna, or even through another communication connection such as wired internet connection. In phase 412, information of a location of the first user device is provided to a server system connected to the communication network over the first radio connection. For example, GPS coordinates determined by a GPS module in the first user device may be sent to the server system. In phase 414, link setup information is received from the server system over the first radio connection, the link setup information comprising data for forming a second radio connection from the location of the first user device to a communication network using a beam forming antenna. In phase 416, a beam forming antenna module of the user device or a beam forming antenna module to which the user device is operatively connected in a beam forming mode. In phase 418, a second radio connection may be formed from the first user device to the communication network using a beam forming antenna operating in a beam forming mode by using the link setup information. For example, the link setup information may contain installation instructions for the user such that the user device can be mounted on the proper wall of a building for a good radio path to a network radio node. The link setup information may contain information on the radio node to which the user device connects over the second radio connection.

The first radio connection may be formed using a broad radiation pattern of an antenna, for example an omnidirectional radiation pattern, half-space radiation pattern or a quarter-space radiation pattern. The information of location of the user device may comprise position coordinates, a street address and/or local radio network information. Such location information may be formed by satellite positioning such as GPS or GLONASS. Location information may also be received to the first user device, and then stored into a memory of the first user device, for example from a device with positioning capability over a short range radio connection. The link setup information may comprise information for physically mounting the user device, and a user may be provided with such information for physically mounting the user device e.g. on a display or over a short range radio connection. The link setup information may comprise information of a radio network node, and a second connection to the radio network node may be formed by searching a connection direction for the beam forming antenna of the user device. The user device may provide information of radio connection quality of the (second) radio connection to the server system so that statistical information may be collected. The first communication network to which the first radio connection is made and the second communication network to which the second radio connection is made may be the same network, such as a mobile communication network or the internet or their combination.

The first user device may comprise a router device, and a third radio connection may be formed from the first user device to a second user device, and data may be routed between the second radio connection and the third radio connection. The second radio connection may be a mobile communication network connection, such as a 3G or 4G network connection, and the third radio connection may be a local radio network connection, such as a WLAN connection. A local area network may also be formed over a wired connection or a fiber connection, or any combination of a radio connection, wired connection and fiber connection.

The location information of the (first) user device may also be formed by another user device such as a smartphone user device. The other user device may have a positioning module and/or other sensors like a compass or a barometer for determining location information of the user device. This information may be provided to the (first) user device over a local radio connection such as WLAN or Bluetooth. This information may then be provided over the radio connection of the first user device to the server system. Such an arrangement allows the first user device not to have e.g. positioning capability, thereby simplifying the structure of the first user device. Also, link setup information may be received from the server system to another user device and further provided to the first user device for forming the radio link connection.

The link setup information may also be formed at another user device completely or in part, instead of the server system. For example, a smartphone user device may comprise an application (downloaded from an application repository) and data for determining the link setup information. Data in the other user device may be provided from the network, e.g. as a data file or embedded in the application installation. With this data, and with other capabilities like map data and/or positioning capability of the other user device, the other user device may be able to provide link setup information to the first user device.

Figure 4B:
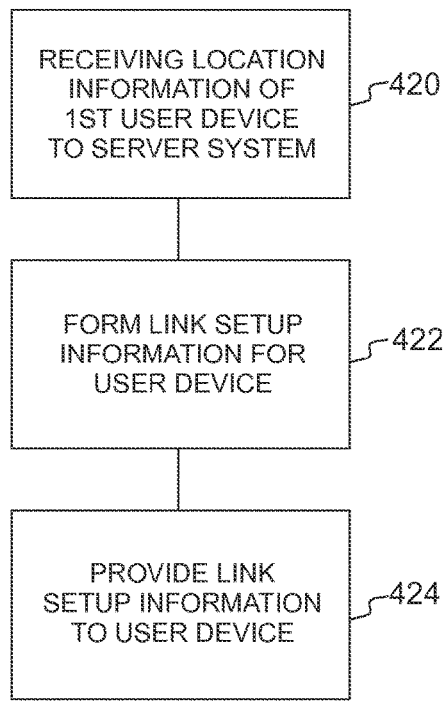

FIG. 4b shows a flow chart for forming link setup information at a server system for forming a radio link connection. In phase 420, information of a location of a first user device is received to a server system connected to a communication network. Using this location information, link setup information may be formed in the server system in phase 422. The link setup information may comprise data for forming a radio connection from the location of the first user device to a communication network using a beam forming antenna. In phase 424, this link setup information may then be provided from the server system to the user device. The link setup information may be sent to the user device at least in part over a first radio connection, where the first radio connection was formed from the user device to the network.

The information of location may comprise (geographical) positioning coordinates, a street address and/or local radio network information. The link setup information may comprise information for physically mounting the user device such that the information can be provided to a user. The link setup information may comprise information of a radio network node for forming a second connection to the radio network (to this node) by searching or calculating a connection direction for the beam forming antenna of the user device. The server system may also receive information of radio connection quality of the second radio connection. The server system may maintain a database on radio connection quality based on user device locations and radio network node locations, and the link setup information may be formed using information in the database. The server system may maintain a database on radio network node allocations to radio connections, and the link setup information may be formed using information in the database.

Figure 4C:
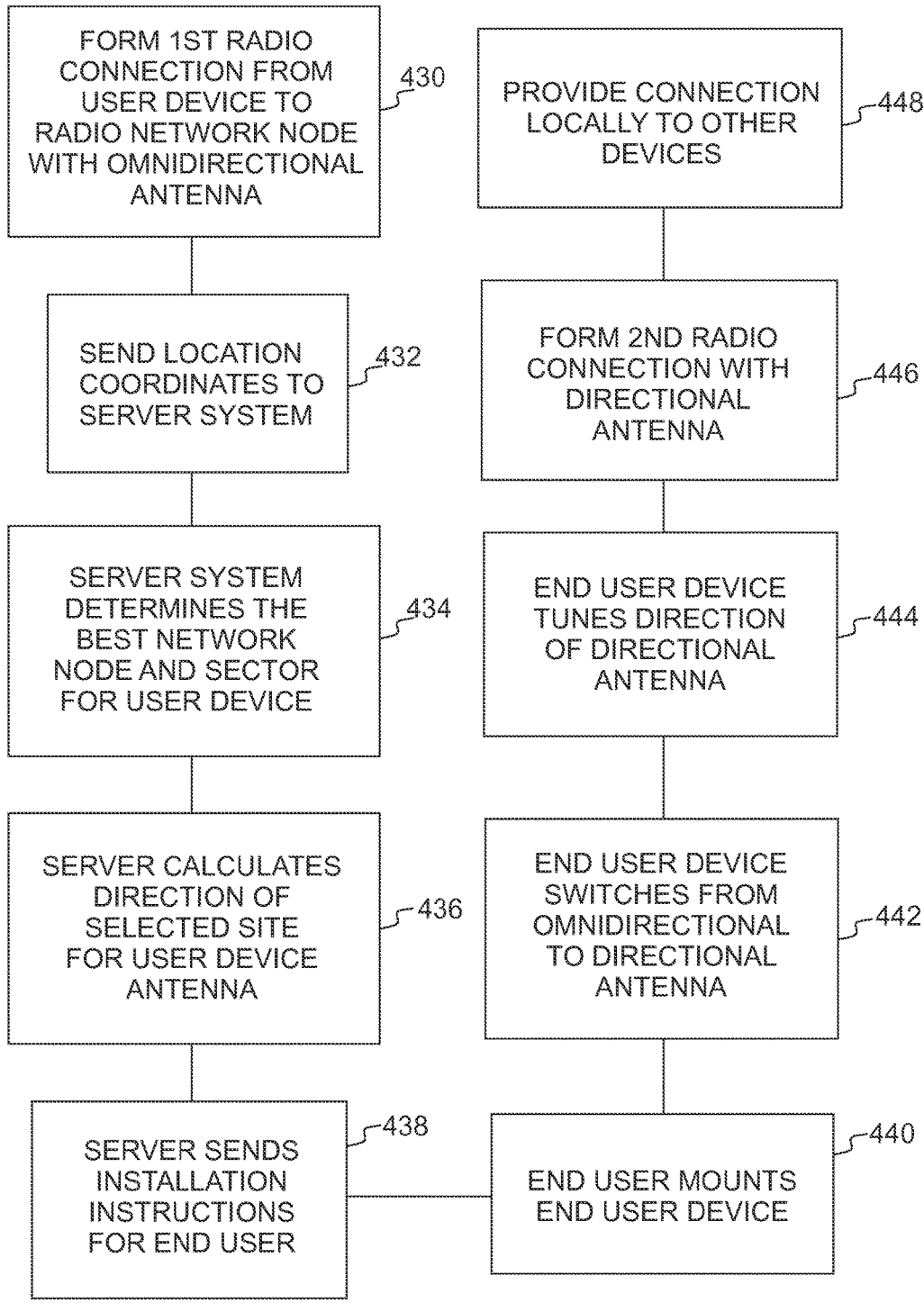

FIG. 4c shows a flow chart for forming a radio link connection from a user device with the help of link setup information from a server system. In phase 430, the user device may be powered on and a radio connection may be formed from a user device to a radio network node, e.g. with an omnidirectional radiation pattern of an antenna. In phase 432, location coordinates or other location information may be sent from the user device (or from another device) to the server system. In phase 434, the server system may determine the appropriate network node e.g. based on signal strength calculations for providing a radio link connection to the user device. In phase 436, the server system may calculate a direction of connection for a selected user device cite and mounting place such that a directional antenna of the user device may establish a connection to a radio node using this direction information. In phase 438, the server system may send or otherwise provide available instructions for an end user to install the user device. In phase 440, the user device may be installed on a wall e.g. with the help of a mounting grid, and powered on. In phase 442, the end user device may switch to use a directional antenna mode. In phase 444, the user device may tune the directional antenna with respect to transmission and reception direction to provide a good connection to the network radio node. This tuning may happen by searching the best direction or by calculating it from information provided by the server system. In phase 446, the user device may establish this connection to be a radio link (e.g. by storing the determined direction and connection parameters to memory) between the user device and the network. In phase 448, the user device may provide the wide area network connection to other user devices by forming a local network or by operating as a router for a local network. In the flow charts and description above, the order of phases may be different than indicated, some phases may be missing and there may be additional phases than the above.

The various embodiments of the invention may be implemented with the help of computer program code that resides in a memory and causes the relevant apparatuses to carry out the invention. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features described earlier.

It is clear that the present invention is not limited solely to the above-presented embodiments, but it can be modified within the scope of the appended claims.

The invention claimed is:

1. A method, comprising:
forming a first radio connection from a first user device to a communication network, the first user device comprising a router device for connecting to a mobile communication network,
providing information of a location of said first user device to a server system connected to said communication network over said first radio connection,
receiving link setup information from said server system over said first radio connection to said first user device, said link setup information comprising data for forming a second radio connection from said location of said first user device to a communication network using a beam forming antenna of said first user device,
forming a second radio connection from said first user device to said communication network using said beam forming antenna of said first user device, said beam forming antenna operating in a beam forming mode by using said link setup information received from said server system to said first user device.

2. A method according to claim 1, comprising:
forming said first radio connection using a broad radiation pattern of an antenna of the group of omnidirectional radiation pattern, half-space radiation pattern and a quarter-space radiation pattern.

3. A method according to claim 1, wherein said information of location comprises one or more of the group of position coordinates, a street address and local radio network information.

4. A method according to claim 1, comprising:
forming said information of location by satellite positioning.

5. A method according to claim 1, comprising:
receiving said information of location to said first user device,
storing said information of location into a memory of said first user device.

6. A method according to claim 1, wherein said link setup information comprises information for physically mounting said user device, said method comprising:
providing to a user said information for physically mounting said user device.

7. A method according to claim 1, wherein said link setup information comprises information of a radio network node, said method comprising:
forming second connection to said radio network node by searching or calculating a connection direction for said beam forming antenna.

8. A method according to claim 1, comprising:
providing information of radio connection quality of said second radio connection to said server system.

9. A method according to claim 1, comprising:
forming a third radio connection from said first user device to a second user device,
routing data between said second radio connection and a third radio connection.

10. A method according to claim 9, wherein said second radio connection is a mobile communication network connection, such as a 3G or 4G network connection, and said third radio connection is a local radio network connection, such as a WLAN connection.

11. A method according to claim 1, comprising:
forming a wired local area network, such as Ethernet or fibre optic network,
routing data between said second radio connection and said wired local area network.

12. A method, comprising:
receiving information at a server system of a location of a first user device to a server system connected to a communication network, the first user device comprising a router device for connecting to a mobile communication network, forming link setup information in said server system, said link setup information comprising data for forming a radio connection from said location of said first user device to a communication network using a beam forming antenna of said first user device, sending said link setup information from said server system to said user device for forming a radio connection from said location of said first user device to a communication network using said beam forming antenna of said first user device.

13. A method according to claim 12, wherein said information of location comprises one or more of the group of position coordinates, a street address and local radio network information.

14. A method according to claim 12, wherein said link setup information comprises information of a radio network node for forming a second connection to said radio network node from said first user device by searching or calculating a connection direction for said beam forming antenna of said first user device.

15. A method according to claim 12, comprising:
receiving information of radio connection quality of said second radio connection in said server system.

16. A method according to claim 12, comprising:
maintaining a database on radio connection quality based on user device locations and radio network node locations,
forming said link setup information using information in said database.

17. A method according to claim 12, comprising:
maintaining a database on radio network node allocations to radio connections,
forming said link setup information using information in said database.

18. An apparatus comprising a beam forming antenna, at least one processor, memory including computer program code, the apparatus comprising a router for connecting to a mobile communication network, the memory and the computer program code configured to, with the at least one processor, cause the apparatus to perform at least the following:

form a first radio connection from said apparatus to a communication network, provide information of a location of said apparatus to a server system connected to said communication network over said first radio connection, receive link setup information from said server system over said first radio connection by said apparatus, said link setup information comprising data for forming a second radio connection from said location of said apparatus to a communication network using said beam forming antenna of said apparatus, form a second radio connection from said apparatus to said communication network using said beam forming antenna of said apparatus, said beam forming antenna operating in a beam forming mode by using said link setup information received from said server system.

* * * * *